United States Patent [19]

Uhrner

[11] Patent Number: 4,502,694
[45] Date of Patent: Mar. 5, 1985

[54] AXIAL SHAFT SEALING UNIT WITH IMPROVED HOUSING

[75] Inventor: Klaus-Jürgen Uhrner, Leingarten, Fed. Rep. of Germany

[73] Assignee: KACO GmbH+Co., Heilbronn, Fed. Rep. of Germany

[21] Appl. No.: 567,959

[22] Filed: Jan. 4, 1984

[30] Foreign Application Priority Data

Jan. 4, 1983 [DE] Fed. Rep. of Germany ....... 3300064

[51] Int. Cl.³ .............................................. F16J 15/36
[52] U.S. Cl. .......................................... 277/9; 277/42;
277/88; 277/50; 277/9.5
[58] Field of Search ............. 277/42, 43, 81 R, 38–41,
277/85–90, 1, 9, 9.5, 92, 93 R, 10, 11, 93 SD, 50,
182, 183, 186, 187, 189, 189.5

[56] References Cited

U.S. PATENT DOCUMENTS

| 1,519,072 | 12/1924 | Tarlton | 277/90 X |
| 2,411,509 | 11/1946 | Endebak | 277/93 SD X |
| 3,554,559 | 1/1971 | Dahlheimer | 277/85 X |
| 3,560,003 | 2/1971 | Smith | 277/42 X |
| 4,136,885 | 1/1979 | Uhrner | 277/42 X |

FOREIGN PATENT DOCUMENTS

| 26631 | 4/1981 | European Pat. Off. | 277/42 |
| 594502 | 11/1947 | United Kingdom | 277/88 |
| 1148554 | 4/1969 | United Kingdom | 277/93 SD |
| 2091823 | 8/1982 | United Kingdom | 277/88 |

Primary Examiner—Robert S. Ward
Attorney, Agent, or Firm—Becker & Becker, Inc.

[57] ABSTRACT

A slide ring seal intended for the sealing of a rotating machine component. The seal comprises an annular housing in which are accommodated a slide ring, a bellows-like secondary seal, and a counter ring which is arranged with force fit on the rotating machine component. The secondary seal bears via a spring axially on the slide ring. The counter ring, and hence the slide ring bearing thereon, are limited by stops in the axial direction in the housing. The counter ring bears directly on the rotating machine component, so that an additional holding member for accommodating the counter ring is not necessary. This permits a very considerable reduction in the plane running deviation of the counter ring slide face with respect to the rotatable machine component, which is extremely important to a satisfactory function of the slide ring seal. By eliminating the holding member, and by means of a static seal between holding member and counter ring, considerable production and assembly costs can be saved.

17 Claims, 8 Drawing Figures

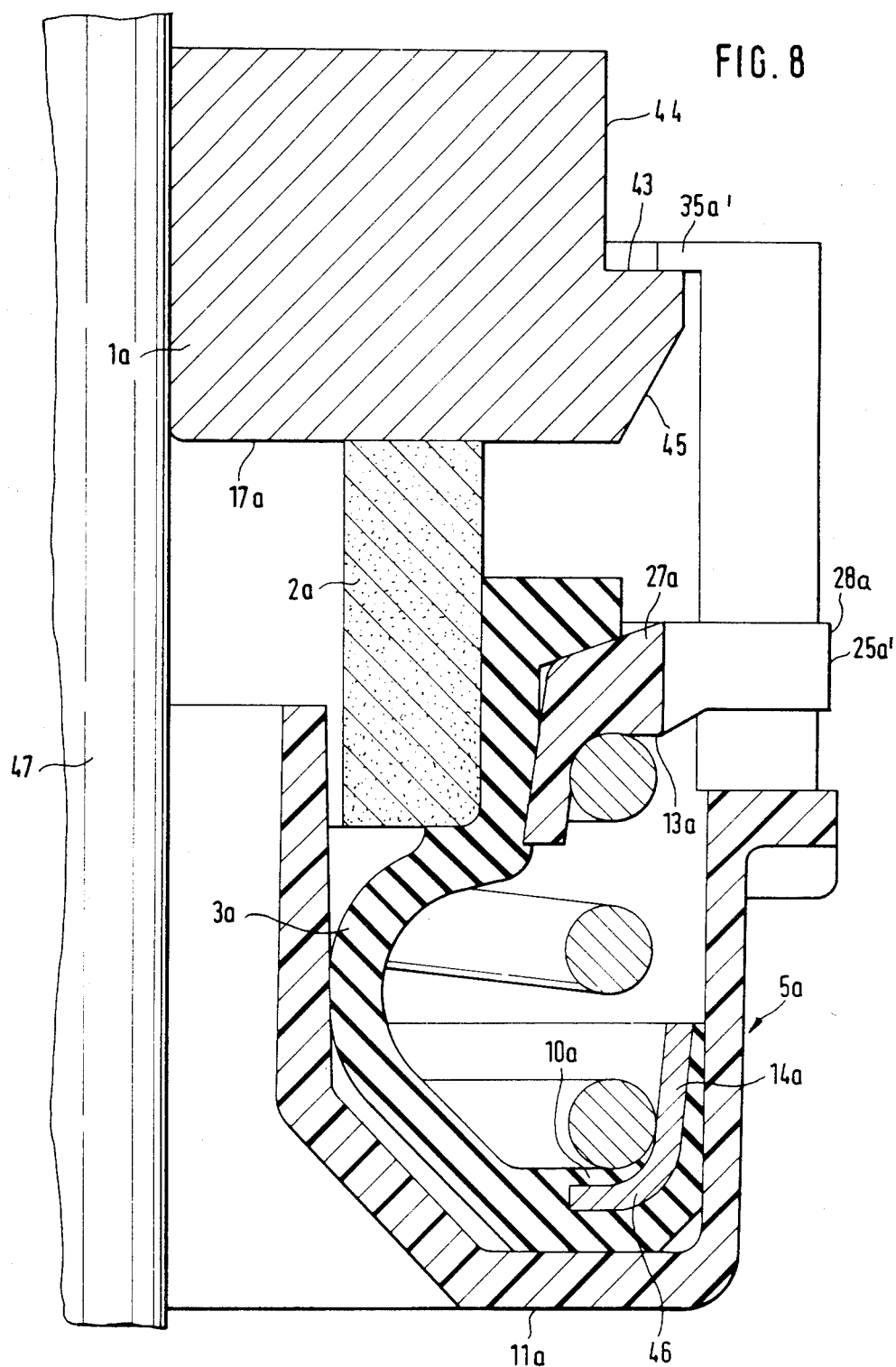

AXIAL SHAFT SEALING UNIT WITH IMPROVED HOUSING

BACKGROUND OF THE INVENTION

The present invention relates to a slide ring seal for sealing rotating machine components, in particular shafts; the seal comprises a housing in which are disposed/primary seal constructed as slide ring, and a bellows-like secondary seal, the latter being axially fixed with at least one spring with respect to the slide ring, which bears on a slide face of a counter ring which is adapted to be secured on the shaft with force fit and with which an axial stop limitation is associated.

According to one known slide ring seal of this type (German Offenlegungsschrift No. 25 31 749) the counter ring is pressed in a rigid and medium-sealing manner into a sleeve end which is bent outwardly in cross-section in an L-shape, accompanied by the interposition of a rubber packing. The sleeve is mounted over its entire length with force fit on the rotating machine component. The stop limitation is formed by the other end of the sleeve, which widens outwardly in a funnel-like manner.

Because of its end which receives the counter ring, the relatively long sleeve portion, and the widened end, the sleeve is of complicated construction and therefore expensive to make. The assembly of the complete counter ring is also complicated because three parts, i.e. counter ring, rubber packing, and holding means, must be assembled together. In addition, the rubber ring and the counter ring must be exactly aligned with respect to the sleeve part and also with respect to each other to ensure that the slide face of the counter ring lies as perpendicular as possible to the axis of the rotating machine component to minimize the plane running deviation of the counter ring slide face. Due to inevitable form deviations of these individual parts, and the additional position deviations which occur during assembly, it is hardly possible to align the slide face of the counter ring exactly with respect to the rotating machine component, so that when the machine component rotates, the counter ring exhibits a wobble movement which subjects the slide ring seal to premature wear. In addition, the slide face of the counter ring cannot be refinished by machine lapping because the sleeve of the holding means projects beyond the slide face. If the complete seal unit is opened for inspection purposes or for refinishing, i.e. the counter ring must be removed from the slide ring seal, the sleeve must be destroyed, so that it cannot be used again.

It is an object of the present invention to construct a seal of the aforementioned general type in such a manner that with low production costs and only a small number of components, the counter ring can be assembled in a simple technical manner to give an extremely accurate alignment with respect to the rotating machine component, so that a wobble movement when the latter rotates is avoided.

BRIEF DESCRIPTION OF THE DRAWINGS

This object, and other objects and advantages of the present invention, will appear more clearly from the following specification in conjunction with the accompanying drawings, in which:

FIG. 8 is an axial section through part of another inventive embodiment of a slide ring seal.

SUMMARY OF THE INVENTION

Figure 1:
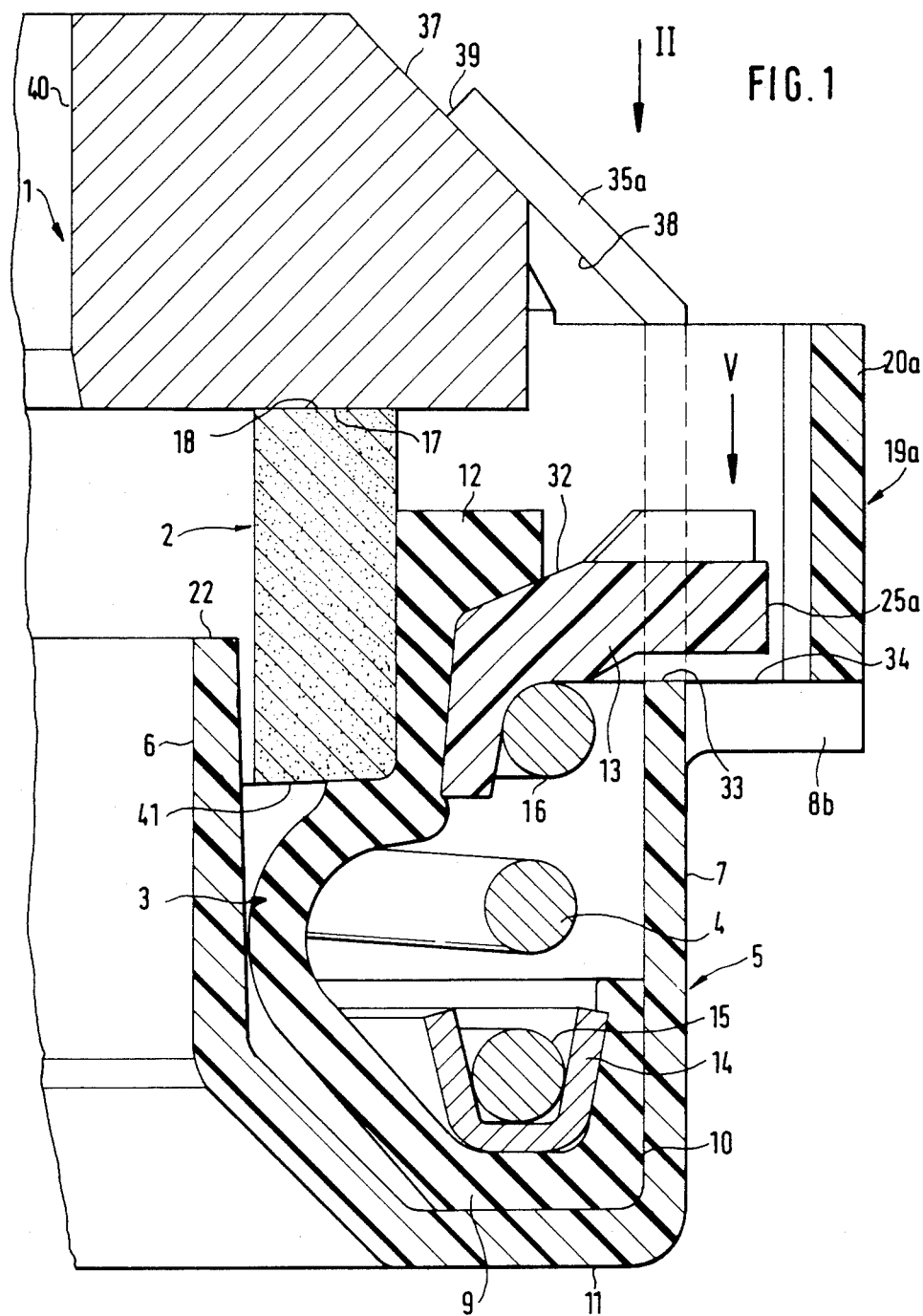
FIG. 1 is an axial section through one half of one embodiment of a slide ring seal of the present invention.

The slide ring seal of the present invention is characterized primarily in that at least that portion of the counter ring which is provided with the slide face is adapted to be secured via an axially extending inner wall on the rotating machine component, and in that the stop limitation is formed by the housing.

Since the counter ring is supported between the slide ring and the housing, it can be pressed directly onto the rotating machine component. As a result, additional holding parts for the counter ring can be dispensed with. Due to the elimination of these relatively expensive parts, and their connection to the counter ring, considerable costs can be saved in production and assembly of the seal of the present invention. The elimination of a holding member also has the advantage that no such member projects beyond the slide face of the counter ring, so that if necessary the slide face can be simply and rapidly refinished, for example by lapping, polishing, or the like. Finally, the inventive seal also has an extremely high sealing effect because the slide face of the counter ring is aligned in its vertical position with respect to the axis of the rotating machine component, which enables the plane running deviations to be minimized. Such deviations then only depend on the manufacturing tolerances of the counter ring which are no longer increased by form errors and position deviation of other parts.

Pursuant to further features of the present invention, the counter ring may be provided with an outer face which extends transverse to the housing axis and is associated with the stop limitation. This outer face may extend at an angle of about 45° to the housing axis, and may extend over about half of the axial height of the counter ring. Alternatively, the outer face may be formed by a substantially radial shoulder face of an annular shoulder of the counter ring.

The stop limitation may be formed by having at least one end tongue of the outer wall of the housing projecting into said housing. A plurality of tongues may be provided in succession in the peripheral direction at preferably uniform intervals. The tongues may be provided between receivers of the housing located adjacent to one another in the peripheral direction. The tongues may bear at least in the region of their free, preferably trapezoidally tapered, ends completely on the outer face of the counter ring.

The receivers may have a substantially U-shaped cross-section in radial section. Plug extensions of a spring plate disposed between the spring and the slide ring may respectively project into each of the receivers. The plug extensions may be disposed between edge-open recesses of a substantially radially extending leg of the spring plate, which is substantially L-shaped in cross-section. The plug extensions may have a substantially U-shaped cross-section, at least in an upper portion which faces the counter ring. The plug extensions, in the peripheral direction, may be disposed essentially in a form-locking manner in the receivers.

The slide ring may have a substantially rectangular cross-section, and may have its narrow side, which faces the housing bottom, disposed in an associated receiving opening of the secondary seal.

DESCRIPTION OF PREFERRED EMBODIMENTS

Referring now to the drawings in detail, the slide ring seals according to FIGS. 1 to 8 serve to seal a stationary machine component with respect to a rotating machine component; these seals are preferably used for sealing coolant pumps of motor vehicles.

Figure 2:
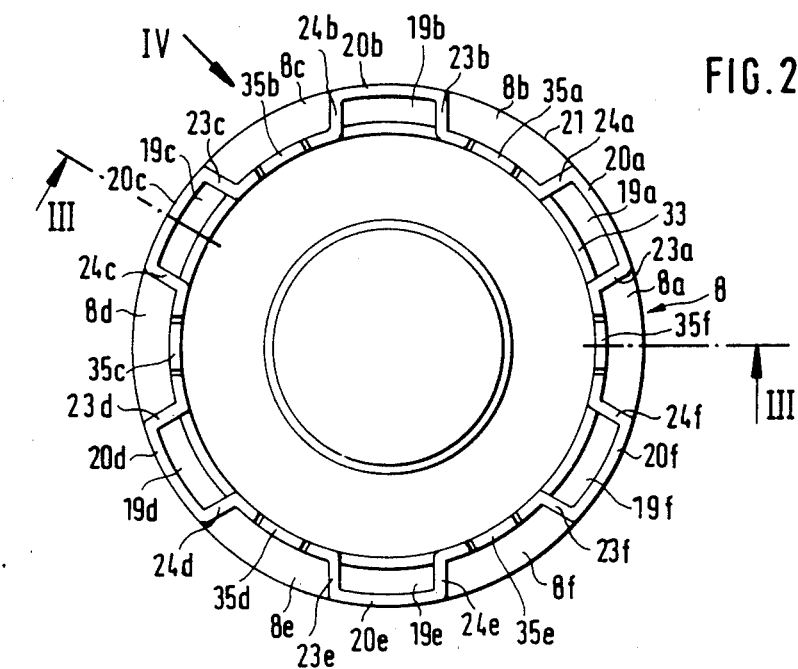
FIG. 2 shows a housing of the seal in plan view, and is taken in the direction of arrow II of FIG. 1.

The slide ring seal according to FIGS. 1 to 7 comprises a counter ring 1, a slide ring 2 which forms the primary seal, and a bellows-like secondary seal 3; these parts are disposed in an annular housing 5. The housing 5 has a cup-shaped cross-section having an annular inner wall 6 and a slightly axially shorter outer wall 7 which is substantially coaxial with the inner wall 6 and which comprises radially outwardly extending flange portions 8a to 8f (FIG. 2). In the exemplary embodiment, six flange portions which are made identical are provided at equal intervals over the periphery of the outer wall 7. The periphery-side spacing between adjacent flange portions, and the thickness of the flange portions, are preferably chosen in such a way that access openings are formed for a tool, for example a screwdriver. This makes it possible to again remove a slide ring seal already installed in a pump from the latter without a special tool and without damage.

The housing 5, which preferably consists of plastic, is sealingly inserted with force fit into a recess of the machine component (not illustrated), while the counter ring 1 is mounted non-rotationally and sealingly on the rotating machine component (likewise not illustrated), preferably a pump shaft of a motor vehicle coolant pump.

The secondary seal 3, which comprises rubber-resilient material, rests with a crosspiece 9 of an end 10 which is substantially U-shaped in axial section (FIG. 1) on the housing bottom 11, while its other end 12, which is directed radially outwardly in a substantially L-shaped manner, is disposed in a form-locking manner in a spring plate 13, which is also substantially L-shaped in cross-section.

The ends 15, 16 of a compression or pressure spring 4 respectively bear against the spring plate 13 and against a second spring plate 14, which is disposed on the end 10 of the secondary seal and is also substantially U-shaped in cross-section. The slide ring 2 is pressed by the compression spring 4 and the secondary seal 3 axially against the counter ring 1, so that the slide faces 17, 18 are in complete engagement with each other. For this purpose, the secondary seal 3 engages around the slide ring 2 at the side remote from the counter ring 1 and at the radially outer surface. The compression spring 4 is coaxial with respect to the counter ring 1, the slide ring 2, and the secondary seal 3.

Directly above the flange portions 8a to 8f, and between adjacent flange portions, the housing 5, as shown in the plan view according to FIG. 2, comprises substantially U-shaped receivers 19a to 19f, the outer face of which is formed by cross webs or crosspieces 20a to 20f and is disposed, together with the radially outer end faces of the flange portions, on a common imaginary cylindrical surface 21. The radial inside width of the receivers 19a to 19f is approximately half as great as their length measured in the peripheral direction. The receivers extend in the axial direction from the flange portions 8a to 8f beyond the slide face 17 of the counter ring 1 (FIG. 1). As shown in FIG. 1, the flange portions 8a to 8f have a smaller axial distance from the housing bottom 11 than does the end face 22 of the inner wall 6. The receivers 19a to 19f are relatively wide in the peripheral direction, and have a relatively large axial length, so that the outer wall 7, in spite of the interruption in the region between the legs 23a to 23f and 24a to 24f (FIG. 2), has a high strength and natural or dimension stability.

Figure 6:
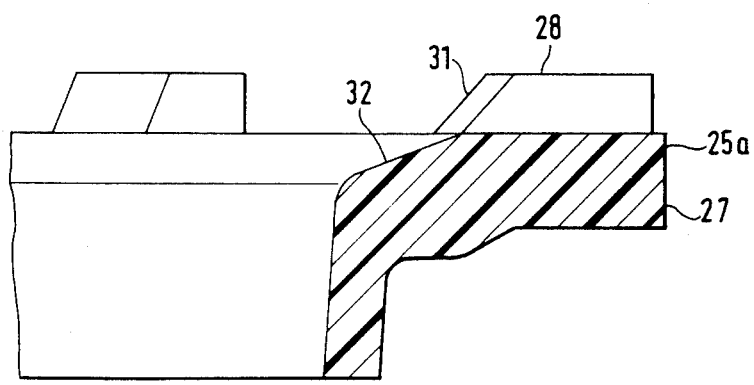
FIG. 6 shows a fragment of the spring plate of FIG. 5 in axial section, and is taken along the line VI—VI of FIG. 5.
Figure 7:
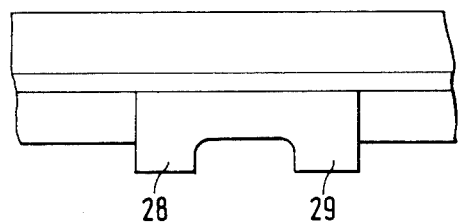
FIG. 7 is a view taken in the direction of the arrow VII in FIG. 5.

The receivers 19a to 19f serve to receive plug extensions 25a to 25f of the spring plate 13 (FIGS. 1 and 5) which are held in the peripheral direction and in the radial direction in a substantially form-locking manner between the legs 23a to 23f and 24a to 24f of the receivers. This secures the spring plate 13 and hence the secondary seal 3 against twisting in the peripheral direction so that the secondary seal cannot be distorted. In addition, the securing of the secondary seal 3 against twisting in the housing 5 ensures that the slide ring 2 is perfectly aligned with the housing. The plug extensions 25a to 25f are separated from one another by edge-open recesses 26a to 26f in a radial annular leg 27 of the spring plate 13. As apparent in particular from FIGS. 5 and 7, the plug extensions 25a to 25f have a U-shaped cross-section with axially extending legs 28 and 29, the radial inner end faces 30 and 31 of which merge inclined into the leg 27 and there into an inclined support face 32 for the end 12 of the secondary seal 3 (FIGS. 1 and 6). When the seal is pressed together in the axial direction to the maximum extent, the plug extensions 25a to 25f lie on an end face 33 of the outer wall 7 which is disposed in a common radial plane with a top side 34 of the flange portions 8a to 8f. Due to the U-shaped configuration of the plug extensions 2a to 25f, the flank area is enlarged without producing a material accumulation unfavorable to plastics.

Figure 3:
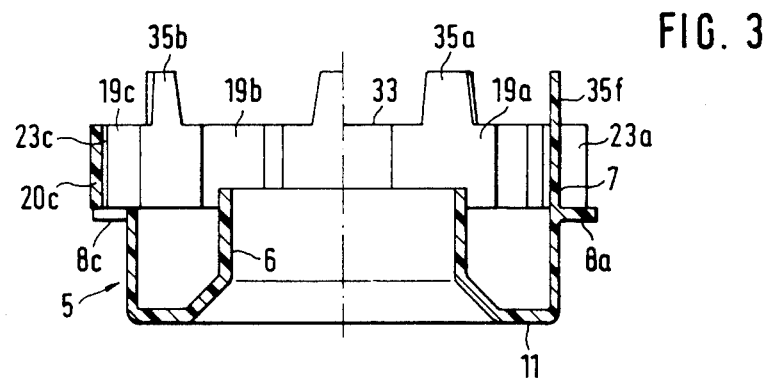
FIG. 3 is a section taken along the line III—III of FIG. 2.
Figure 4:
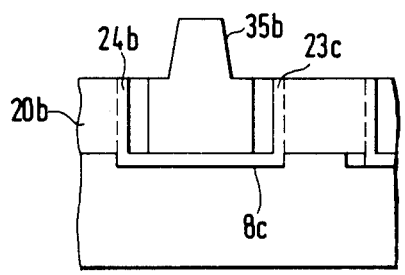
FIG. 4 is a view taken in the direction of the arrow IV in FIG. 2.
Figure 5:
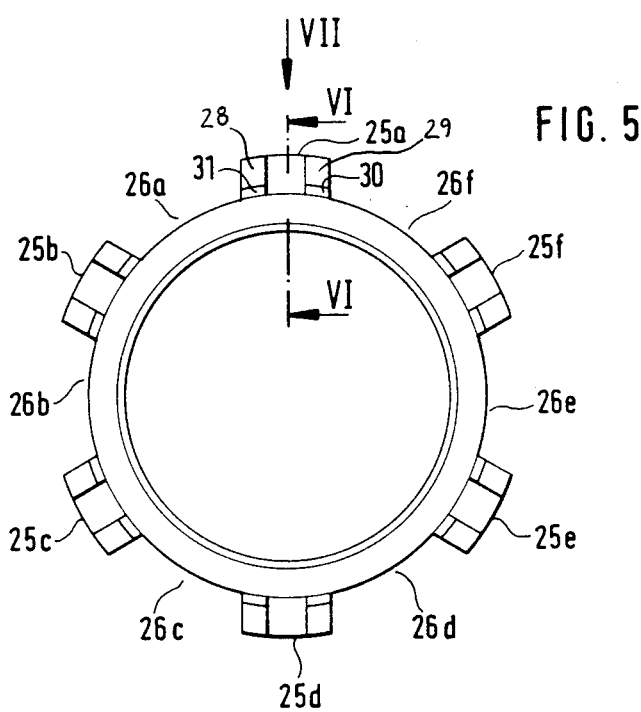
FIG. 5 shows a spring plate of the seal in plan view, and is taken in the direction of the arrow V in FIG. 1.

As shown in particular in FIGS. 1 to 3, at the radial end face 33 of the outer wall 7, between respective adjacent receivers 19a to 19f, tongues 35a to 35f are provided which are made integrally with the housing wall. The tongues 35a to 35f taper in side elevation (see FIG. 3) trapezoidally outwardly and extend in the assembled state of the slide ring seal (FIG. 1) radially inclined inwardly, preferably at an angle of about 45° to the housing axis. The tongues 35a to 35f form a stop limitation for the counter ring 1 and thus the slide ring 2. The counter ring 1 is provided in its half remote from the housing bottom 11 a radially outer conical face 37 with which it rests along a plane on the inner face 38 of the tongues 35a to 35f (FIG. 1). The tongues 35a to 35f define an introduction opening 39, the inside width of which in the assembled position is substantially smaller than the maximum outer diameter of the counter ring 1. The length of the tongues is approximately equal to the axial length of the receivers 19a to 19f. The tongues 35a to 35f can be bent resiliently outwardly to open the cassette-like seal, so that for example the counter ring 1 can be removed for refinishing and inspection purposes. The inner annular face 40 of the counter ring 1 is mounted directly and rigidly on the rotating machine component. Its slide face 17 is accessible after removal from the housing 5 and can therefore be worked extremely simply and rapidly. Due to the elimination of an additional holding means and the simple construction of the counter ring 1, which has a substantially square cross-section, said ring can be made extremely simply with low production tolerances. Since in addition to the low dimensional deviations it is also not possible for position deviations to occur in the arrangement of the counter ring in any holding means, the counter ring can be aligned exactly perpendicularly to the axis of the rotating machine component, so that during rotation it exhibits no wobble, or at the most negligible wobble, and its slide face 17 is always in complete engagement with the slide face 18 of the slide ring 2. This ensures a high sealing action. Finally, the slide ring 2 is made extremely simply; it has an elongated rectangular cross-section, and its narrow sides 18 and 41 engage the counter ring 1 and the secondary seal 3. Because of the simple form described, these parts can be made simply and therefore at low cost. Since moreover the housing is of simple design and can be opened without being destroyed, any refinishing of the counter ring or slide ring can be carried out simply and rapidly because of the easy access to these parts. This enables a considerable saving in costs, so that the slide ring seal can be made and mounted extremely cheaply.

The embodiment according to FIG. 8 differs from that according to FIGS. 1 to 7 in that the tongues 35a' project radially inwardly and rest on a similar radial shoulder face 43 of an annular shoulder 44 of the counter ring 1a. Between the annular shoulder 44 and the slide face 17a of the counter ring 1a, the latter is provided with an annular face 45 which adjoins the slide face and with which the counter ring 1a, upon insertion into the housing 5a with the housing bottom 11a, slides along the tongues 35a, thereby pressing the latter resiliently outwardly. The spring plate 14a has an L-shaped cross-section, with its shorter leg 46 being vulcanized into the end 10a of the secondary seal 3a. The other spring plate 13a is also provided with plug insertions, with FIG. 8 showing only the plug insertion 25a' in the leg 27a of the spring plate.

In this embodiment as well, the perpendicular and direct engagement of the counter ring 1a on the rotating machine component, preferably on a pump shaft 47, is guaranteed. The securing against twisting of the secondary seal 3a, and its axial stop limitation at the housing 5a, are also assured. Via the tongues 35a', the counter ring can be removed from the housing 5a for refinishing without destroying the latter, and can be simply machined, because its slide face 17a is freely accessible to the finishing tool. The counter ring 1a, the slide ring 2a, and the housing 3a have a simple form, so that they can be made simply and economically.

It has been found in practice that the counter ring 1 and the slide ring 2, in the installed condition, are tilted with respect to one another, so that between the two surfaces 17 and 18 a wedge-shaped, radially outwardly or correspondingly radially inwardly opened gap is formed. Both cases can be disadvantageous, because, for example, abrasive substances can penetrate the gap and can lead to premature wear of the counter ring 1 and the slide ring 2. The change of position of the counter ring 1 and slide ring 2 in the installed condition can be counteracted in an advantageous manner in that the counter ring is given a form such that when the counter ring 1 is pressed onto the shaft, stresses are deliberately produced. As a result of these stresses, the counter face 17 can take up an inclined position in such a manner that the slide ring, which is tilted with respect to the counter ring, again completely rests on the counter face. Also, the configuration of the counter ring 1 can be selected in such a way that due to the stress formation, the counter face 17 of the counter ring 1 is deliberately arranged in such a way that a desired gap is formed or, for example, a contact between counter ring and slide ring takes place only at the outside radially. Such a configuration of the counter ring can, for example, be achieved by bevelling the counter face 17 or, for example, also by a conical formation of the receiving bore 40. The inclined face 37 can also be utilized for such a deliberate inclining of the counter face 17.

The present invention is, of course, in no way restricted to the specific disclosure of the specification and drawings, but also encompasses any modifications within the scope of the appended claims.

What I claim is:

1. A slide ring seal as an axial shaft sealing unit for sealing rotating machine components, said seal comprising:
    a housing, which includes an axial stop limitation;
    a primary seal, which is in the form of a slide ring and is disposed in said housing;
    a bellows-like secondary seal disposed in said housing;
    at least one spring disposed in said housing in such a way as to axially fix said secondary seal relative to said slide ring; and
    a counter ring as a separate part which is provided with an axially extending inner wall, and with a slide face on which said slide ring bears; at least that portion of said counter ring which is provided with said slide face being adapted to be secured via said axially extending inner wall directly on said rotating machine component with force fit subject to avoidance of any separator therewith; said counter ring furthermore being associated with said axial stop limitation connected integrally with said housing.

2. A slide ring seal according to claim 1, in which said counter ring is provided with an outer face which extends transverse to the axis of said housing and is associated with said stop limitation connected integrally with the latter.

3. A slide ring seal according to claim 2, in which said outer face of said counter ring extends at an angle of about 45° to the axis of said housing.

4. A slide ring seal according to claim 3, in which said outer face of said counter ring extends over approximately half of the axial height of the latter.

5. A slide ring seal according to claim 2, in which said counter ring is provided with an annular shoulder having a substantially radially extending shoulder face which forms said outer face.

6. A slide ring seal according to claim 2, in which said housing includes a bottom and a radially outer wall, with that end of said outer wall remote from said housing bottom being provided with at least one tongue, which forms said stop limitation, and projects into said housing.

7. A slide ring seal according to claim 6, in which said outer wall includes a plurality of said tongues, which are provided in succession in the peripheral direction.

8. A slide ring seal according to claim 7, in which said tongues are provided at uniform intervals.

9. A slide ring seal according to claim 7, in which said housing is provided with receivers located adjacent to one another in the peripheral direction; said tongues are provided between said receivers.

10. A slide ring seal according to claim 7, in which at least that portion of said tongues remote from said housing bottom bear completely on said outer face of said counter ring.

11. A slide ring seal according to claim 10, in which that portion of said tongues remote from said housing bottom is trapezoidally tapered.

12. A slide ring seal according to claim 9, in which said receivers of said housing have a substantially U-shaped radial cross-section.

13. A slide ring seal according to claim 12, which includes a spring plate disposed between said at least one spring and said slide ring; said spring plate is provided with plug extensions which respectively project into said receivers.

14. A slide ring seal according to claim 13, in which said spring plate is approximately L-shaped in cross-section, and an approximately radially extending leg, with said plug extensions being disposed on the latter in such a way as to form edge-open recesses between them.

15. A slide ring seal according to claim 14, in which said plug extensions have a portion which is remote from said housing bottom and faces said counter ring, with at least said last-mentioned portion of said plug extensions having an approximately U-shaped cross-section.

16. A slide ring seal according to claim 14, in which, in the peripheral direction, said plug extensions are disposed in said receivers in an essentially form-locking manner.

17. A slide ring seal according to claim 7, in which said slide ring has an essentially rectangular cross-section, with one of its narrow sides facing said housing bottom; and in which said secondary seal is provided with a receiving opening for receiving said narrow side of said slide ring which faces said housing bottom.

* * * * *